United States Patent
Ooka et al.

(10) Patent No.: US 12,050,911 B2
(45) Date of Patent: Jul. 30, 2024

(54) COMPUTING DEVICE

(71) Applicant: ROHM CO., LTD., Kyoto (JP)

(72) Inventors: Tetsuya Ooka, Kyoto (JP); Takahiro Nishiyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 16 days.

(21) Appl. No.: 17/984,868

(22) Filed: Nov. 10, 2022

(65) Prior Publication Data

US 2023/0176865 A1 Jun. 8, 2023

(30) Foreign Application Priority Data

Dec. 2, 2021 (JP) .................................. 2021-195985

(51) Int. Cl.
*G06F 9/30* (2018.01)

(52) U.S. Cl.
CPC ........ *G06F 9/3001* (2013.01); *G06F 9/30058* (2013.01)

(58) Field of Classification Search
CPC .... G06F 9/3001; G06F 9/30058; G06F 9/327; G06F 9/321; G06F 9/322; G06F 9/3005; G06F 9/30134; G06F 9/30141; Y02D 10/00
See application file for complete search history.

(56) References Cited

U.S. PATENT DOCUMENTS

| | | | | |
|---|---|---|---|---|
| 3,737,860 A | * | 6/1973 | Sporer | G06F 9/4812 712/E9.083 |
| 5,918,030 A | * | 6/1999 | Christian | G06F 9/3814 712/E9.055 |
| 6,026,486 A | * | 2/2000 | Kodama | G06F 9/3885 712/210 |
| 2009/0144481 A1 | * | 6/2009 | Julicher | G06F 9/461 711/E12.082 |

FOREIGN PATENT DOCUMENTS

JP  53-46537  12/1978
WO  WO-0058828 A1 * 10/2000 ......... G06F 9/30032

* cited by examiner

*Primary Examiner* — Farley Abad
(74) *Attorney, Agent, or Firm* — Fish & Richardson P.C.

(57) ABSTRACT

The present disclosure relates to a computing device. A computing device includes an arithmetic processing circuit configured to execute a program, and a program memory for storing the program. Each instruction in the program has a length of 16 bits. The program memory has a first memory area, and a second memory area in which higher addresses than the first memory area are associated. The arithmetic processing circuit has a 16-bit program counter for specifying an address to be read, and reads and executes an instruction at an address corresponding to an upper 15-bit value of the program counter from a target memory area, wherein the target memory area is, of the first memory area and the second memory area, a memory area corresponding to a value of a least significant bit in the program counter.

13 Claims, 13 Drawing Sheets

COMPUTING DEVICE

TECHNICAL FIELD

The present disclosure relates to a computing device.

BACKGROUND

There is a computing device including a program memory that stores a program as an instruction bundle, and an arithmetic processing circuit (such as a CPU) that executes the program. The arithmetic processing circuit specifies an address that stores an instruction to be read, and reads and executes the instruction from the specified address from the program memory. For example, in a configuration that uses two 8-bit registers to specify addresses, there are $2^{16}$ types of specified addresses, and a maximum size of the program memory is 64 kB.

PRIOR ART DOCUMENT

Patent Publication

[Patent document 1] Japan Patent Publication No. 53-46537

SUMMARY

Problems to be Solved by the Disclosure

Sometimes expansion of a memory space is required. Memory bank switching is available as a means for expansion of a memory space. However, memory bank switching causes issues such as an increased circuit scale and instruction efficiency deterioration.

It is an object of the present disclosure to provide a computing device capable of expanding a memory space of a program memory without involving memory bank switching.

Technical Means for Solving the Problem

A computing device of the present disclosure includes: an arithmetic processing circuit, configured to execute a program; and a program memory, for storing the program. Each instruction in the program has a length of 16 bits. The program memory has a first memory area, and a second memory area in which higher addresses than the first memory area are associated. The arithmetic processing circuit has a 16-bit program counter for specifying an address to be read, and reads and executes an instruction at an address corresponding to an upper 15-bit value of the program counter from a target memory area, wherein the target memory area is, of the first memory area and the second memory area, a memory area corresponding to a value of a least significant bit in the program counter.

Another computing device of the present disclosure includes: an arithmetic processing circuit, configured to execute a program; and a program memory, for storing the program. Each instruction in the program has a length of predetermined bits, wherein the predetermined bits are J bits, in which $J=16\times2^{n-1}$ and n represents an integer of 2 or more. The program memory has $1^{st}$ to $(2^n)^{th}$ memory areas, and an $(i+1)^{th}$ memory area is associated with an address higher than an $i^{th}$ memory area. The arithmetic processing circuit has a program counter of the predetermined bits for specifying an address to be read, and reads and executes an instruction at an address corresponding to a value of upper (J−n) bits in the program counter from a target memory area, wherein the target memory area is a memory area corresponding to a value of lower n bits in the program counter among the $1^{st}$ to the $(2^n)^{th}$ memory areas.

Effects of the Disclosure

According to the present disclosure, a computing device capable of expanding a memory space of a program memory without involving memory bank switching is provided.

DETAILED DESCRIPTION OF THE EMBODIMENTS

Details of the embodiments of the present disclosure are given with the accompanying drawings below. In the reference drawings, the same parts are denoted by the same numerals or symbols, and repeated description related to the same parts are in principle omitted. In the present application, to keep the description simple, sometimes numerals or symbols that refer to information, signals, physical quantities, components or parts are used, and names of the information, signals, physical quantities, components or parts corresponding to these numerals or symbols are omitted or represented in short. For example, a branch destination address storage area 610 referenced as "610" (referring to FIG. 11) may be represented as a branch destination address storage area 610 or may be represented in short as a storage area 610, with both however referring to the same object.

Figure 1:
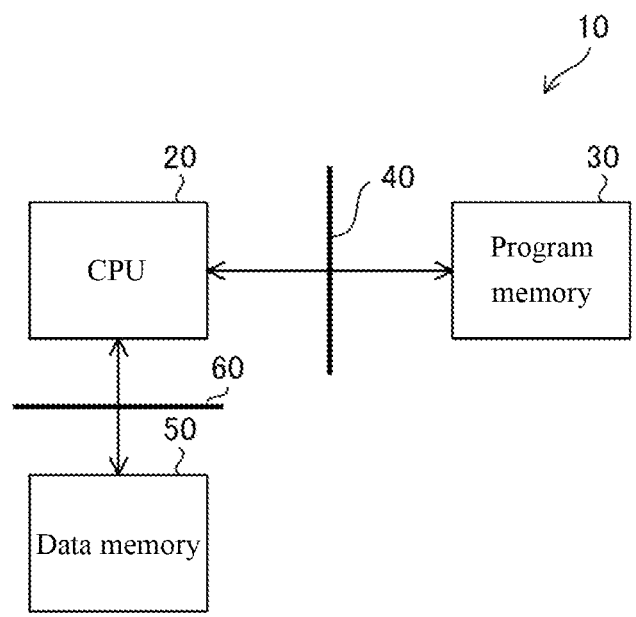
FIG. 1 is a brief block diagram of a computing device according to an embodiment of the present disclosure.

FIG. 1 shows a brief block diagram of a computing device 10 according to an embodiment of the present disclosure. The computing device 10 is formed by, for example, an integrated circuit categorized as a large-scale integration (LSI) circuit. The computing device 10 includes a central processing unit (CPU) 20, a program memory 30, a program memory bus 40, a data memory 50, and a data memory bus 60.

The CPU 20 is an arithmetic processing circuit that computes in a unit of 8 bits. Thus, the computing device 10 may be categorized as an 8-bit microcomputer. The CPU 20 is connected on one side of the program memory bus 40, and the program memory 30 is connected on the other side of the program memory bus 40. That is to say, the CPU 20 and the program memory 30 are connected to each other by the program memory bus 40.

The program memory 30 may be a nonvolatile memory circuit formed by such as a flash memory, or may be a volatile memory circuit including a random access memory (RAM). A program to be executed by the CPU 20 is stored in the program memory 30. The CPU 20 accesses the program memory 30 through the program memory bus 40. An access to the program memory 30 includes a read access for reading data (data representing an instruction) in the program memory 30. The program stored in the program memory 30 includes an instruction (instruction code) bundle to be executed by the CPU 20. The CPU 20 sequentially reads, in synchronization with an operation clock of the CPU 20, the required instruction from the program memory 30 through the program memory bus 40, and sequentially executes, by such as decoding, the read instruction to accordingly execute the program. In the description below, a program referred to in short means a program stored in the program memory 30.

The data memory 50 is a memory disposed separately from the program memory 30 in the computing device 10, and is configured to include a read-only memory (ROM) and a random access memory (RAM). The CPU 20 accesses the data memory 50 through the data memory bus 60. An access to the data memory 50 includes a read access of reading data from the data memory 50 and a write access of writing data into the data memory 50.

Figure 2:
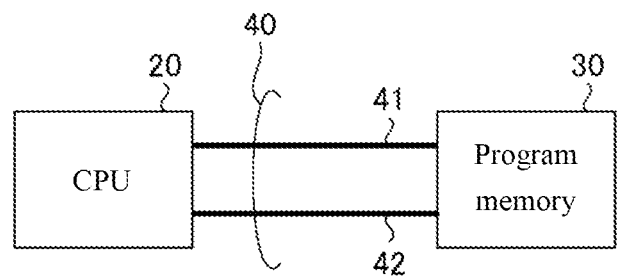
FIG. 2 is a diagram of a configuration of buses of a program memory according to an embodiment of the present disclosure.

As shown in FIG. 2, the program memory bus 40 includes an address bus 41 and a data bus 42. The data memory bus 60 similarly has an address bus and a data bus; however, the drawing of the configuration of the data memory bus 60 is omitted from FIG. 2.

Figure 3:
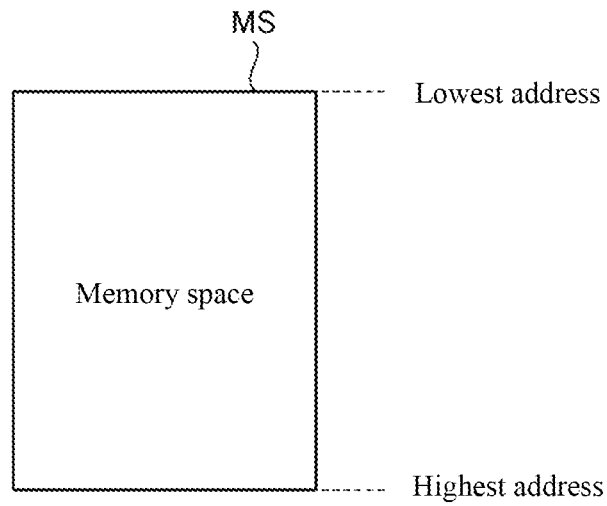
FIG. 3 is a schematic diagram of a memory space according to an embodiment of the present disclosure.

Referring to FIG. 3, the program memory 30 is defined with a memory space MS corresponding to a size of a storage area included in the program memory 30. In the memory space MS, an inherent address is allocated to every 8 bits (that is, one byte). In the description below, an address refers to an address in the memory space MS defined in the program memory 30. The address is represented by a numerical value, and from the perspective of an address of attention, an address represented by a smaller numerical value is an address at a bit lower than the address of attention, and a larger numerical value is an address at a bit higher than the address of attention.

For example, when the memory space MS has a storage area of 64 kB, the lowest address in the memory space MS is "0x0000", and the highest address in the memory space MS is "0xffff". Moreover, in this embodiment, an address is indicated hexadecimally as appropriate. The string "0x" added at the beginning of the numerical value representing an address indicates that the numerical value following the string "0x" is a hexadecimal value. Thus, "0x0000" is represented as "0" in the binary form, and "0xffff" is represented as "65535" in the binary form.

Figure 4:
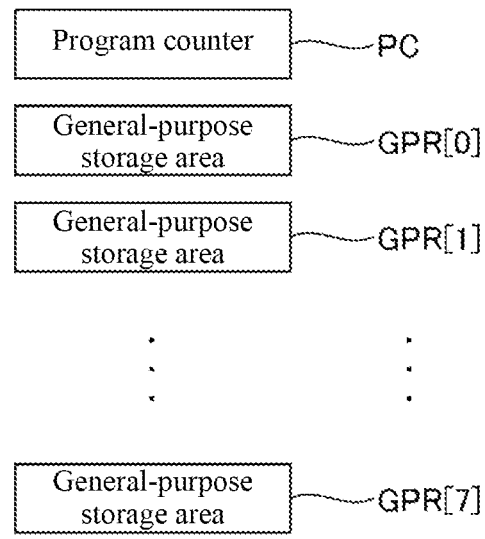
FIG. 4 is a diagram of a program counter disposed in a CPU and multiple general-purpose storage areas according to an embodiment of the present disclosure.

The CPU 20 is provided with multiple registers. Each of the registers is an 8-bit register. All or part of the multiple registers provided in the CPU 20 form a program counter PC and one or more general-purpose storage areas (referring to FIG. 4). The number of the general-purpose storage areas formed may be any as desired; herein, a total of 8 general-purpose storage areas GPR[0] to GPR[7] are formed.

The program counter PC has data stored therein for specifying an address to be read (that is, an address to become a target of a read access). Herein, an address specified by the program counter PC as a target address to be read is referred to as a read target address. Moreover, when the computing device 10 is started, the lowest address in the memory space MS is substituted into the program counter PC.

In the multiple embodiments below, several specific operation examples, application techniques and variation techniques are described. Unless otherwise specified and without causing any contradiction, the items described in embodiments of the preceding description can be applied to embodiments in the following description. In the various embodiments, the description of the embodiments can be considered as overruling in case of any items contradictory from the items described above. Moreover, provided there are not contradictions, the items described in any one of the multiple embodiments below are also applicable to another other embodiment (that is to say, any two or more of the embodiments can be combined as desired).

Reference Example EX_1A

A reference example EX_1A as a comparison to an embodiment EX_1B to be given below is first described. In the reference example EX_1A and the embodiment EX_1B, each instruction executed by the CPU 20 has an instruction length of 16 bits. That is to say, in the reference example EX_1A and the embodiment EX_1B, each instruction executed by the CPU 20 has a length of 16 bits (formed by 16-bit data).

Figure 5:
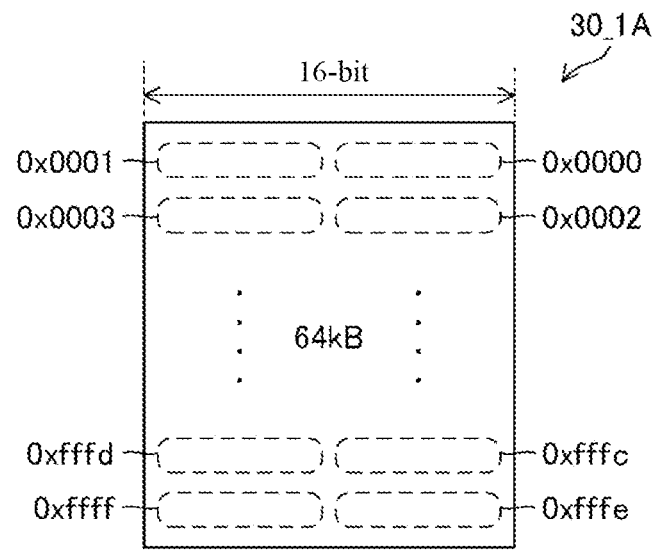
FIG. 5 is a diagram of a configuration of a program memory of a reference example (EX-1A).

The program memory 30 of the reference example EX_1A is especially referred to as a program memory 30_1A. FIG. 5 shows a configuration of the program memory 30_1A. The program memory 30_1A has a memory space MS that is 64 kB at maximum. Herein, the program memory 30_1A has a 64-kB memory space MS. In the program memory 30_1A, the lowest address is "0x0000", and the highest address is "0xffff".

Corresponding to the 16-bit instruction length of each instruction, a data length of a word as a unit for accessing the program memory 30_1A is 16 bits (a 16-bit length). That is to say, the CPU 20 of the reference example EX_1A one-time reads 16-bit data from the program memory 30_1A to read one instruction to be executed next. Thus, in the reference example EX_1A, the data bus 42 is formed by 16 lines.

Figure 6:
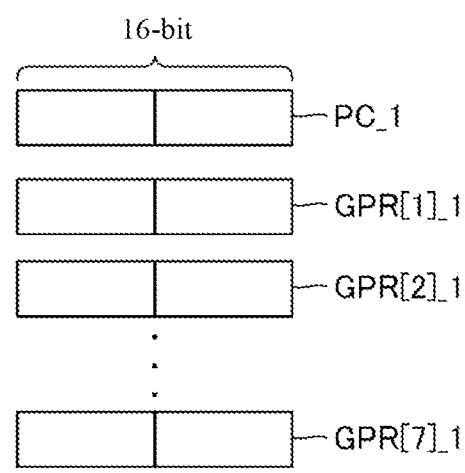
FIG. 6 is a diagram of a program counter and multiple general-purpose storage areas of the reference example (EX_1A) and an embodiment (EX_1B) of the present disclosure.

Referring to FIG. 6, the denotation "PC_1" is used to reference the program counter PC of the reference example EX_1A and the embodiment EX_1B. In the reference example EX_1A and the embodiment EX_1B, the program counter PC_1 is formed by a combination of first and second registers provided in the CPU 20. Corresponding to the 16-bit instruction length of each instruction, each time the CPU 20 executes one instruction, 2 is added to the value of the program counter PC_1 (however, except for branch instructions).

The denotation "GPR[i]_1" is used to reference a general-purpose storage area GPR[i] of the reference example EX_1A and the embodiment EX_1B (where i is an integer). In the reference example EX_1A and the embodiment EX_1B, the general-purpose storage area GPR[1]_1 is formed by a combination of third and fourth registers provided in the CPU 20, and a general-purpose storage area GPR[2]_1 is formed by a combination of fifth and sixth registers provided in the CPU 20. The same applies to general-purpose storage areas GRP[3] to GPR[7].

As described above, each of the registers provided in the CPU 20 is an 8-bit register (that is to say, a register having an 8-bit storage area). Thus, each of the program counter PC_1 and the general-purpose storage areas GPR[0]_1 to GRP[7]_1 has a 16-bit storage area.

Figure 7:
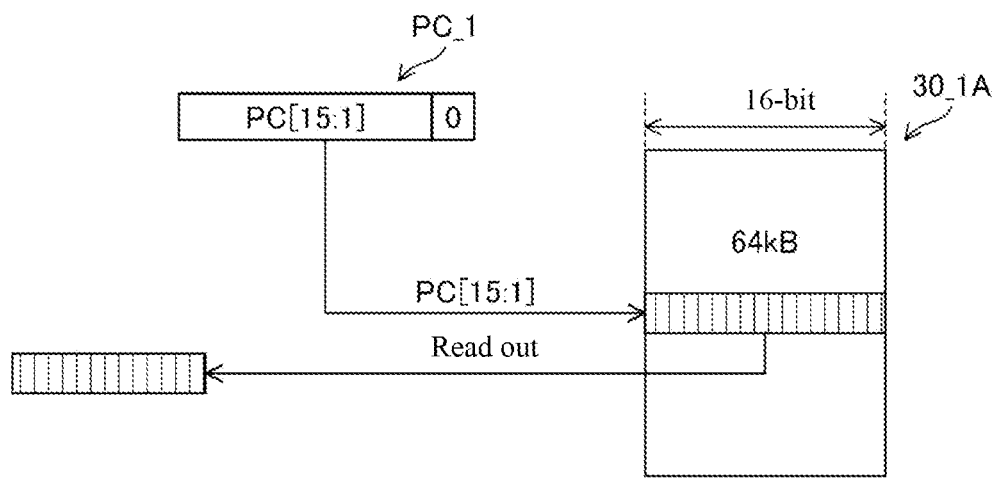
FIG. 7 is a conceptual diagram of actions of reading an instruction from a program memory of the reference example (EX_1A).

FIG. 7 shows a conceptual diagram of actions of reading an instruction (a read access) from a program memory 30_1A of the reference example EX_1A. The denotation "PC[15:1]" is used to represent upper 15 bits in the program counter PC_1. In the reference example EX_1A, a read target address is specified and represented by 16 bits. In the reference example EX_1A, an instruction is read in a unit of 16 bits (that is to say, in a unit of 2 bytes), and thus the least significant bit of the program counter PC_1 is constantly fixed at "0". That is to say, upper 15 bits of the read target address are specified by the values of upper 15 bits of the program counter PC_1, and the value of the least significant bit of the read target address is always "0".

For example, if the values of the upper 15 bits of the program counter PC_1 are all "0", the read target address is "0x0000". At this point, word data (2-byte data) including 1-byte data at the address "0x0000" and 1-byte data at the address "0x0001" is read out from program memory 30_1A as data of one instruction and sent to the CPU 20.

Alternatively, if the values of the upper 15 bits of the program counter PC_1 are all "1", the read target address is "0xfffe". At this point, word data (2-byte data) including 1-byte data at the address "0xfffe" and 1-byte data at the address "0xffff" is read out from program memory 30_1A as data of one instruction and sent to the CPU 20.

In the reference example EX_1A, memory bank switching is available as a means for expanding the memory space MS from 64 kB. In the memory bank switching, multiple 64-kB program memories are provided, and a program memory to be read is appropriately switched by memory bank switching. However, because a circuit needed for memory bank switching is used, the circuit scale may become quite large. Moreover, program description for the memory bank switching may get complicated, and a compiler change needed for implementing the memory bank switching also becomes even more complex. Thus, several instructions need to be executed every time memory bank switching is performed, hence resulting in instruction efficiency deterioration.

Embodiment EX_1B

An embodiment EX_1B is described below. In the embodiment EX_1B, the reference example EX_1A is used as a reference, and the memory space MS is expanded to 128 kB without involving memory bank switching. In the reference example EX_1A, the value of the least significant bit of the program memory PC_1 is fixed at "0", and from personal perspectives, it is equivalently said that this least significant bit is not effectively utilized. In the embodiment EX_1B, the memory space MS is expanded to 64 kB by actively utilizing this least significant bit.

Figure 8:
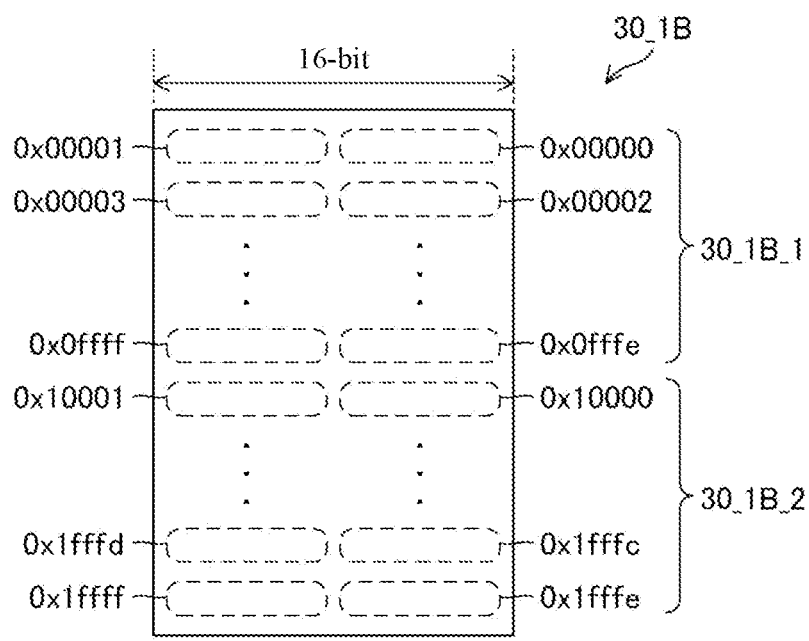
FIG. 8 is a diagram of a configuration of a program memory according to an embodiment (EX_1B) of the present disclosure.

The program memory 30 of the embodiment EX_1B is especially referred to as a program memory 30_1B. FIG. 8 shows a configuration of the program memory 30_1B. The program memory 30_1B has a memory space MS that is 128 kB at maximum. Herein, the program memory 30_1B is set to have a 128 kB memory space MS. In the program memory 30_1B, the lowest address is "0x00000", and the highest address is "0x1ffff".

The program memory 30_1B is configured to include a first memory area 30_1B_1 and a second memory area 30_1B_2. Each of the memory areas is a 64-kB storage area associated with consecutive addresses. If it is considered that the instruction is formed by J bits (16 bits herein), 64 kB are equivalent to $2^J$ bytes. The second memory area 30_1B_2 is associated with addresses higher than the first memory area 30_1B_1. That is to say, the first memory area 30_1B_1 is a memory area from the address "0x00000" to the address "0x0ffff". That is to say, the first memory area 30_1B_1 is a 64-kB memory area from the address "0x10000" to the address "0x1ffff".

Corresponding to the 16-bit instruction length of each instruction, a data length of a word as a unit for accessing the program memory 30_1B is 16 bits (a 16-bit length). That is to say, the CPU 20 of the embodiment EX_1B one-time reads 16-bit data from the program memory 30_1B to read one instruction to be executed next. Thus, in the embodiment EX_1B, the data bus 42 is formed by 16 lines.

Moreover, corresponding to the 16-bit instruction length of each instruction, each time the CPU 20 executes one instruction, 2 is added to the value of the program counter PC_1. However, when the CPU 20 executes the branch instruction, the value according to the branch instruction is substituted into the program counter PC_1.

Figure 9:
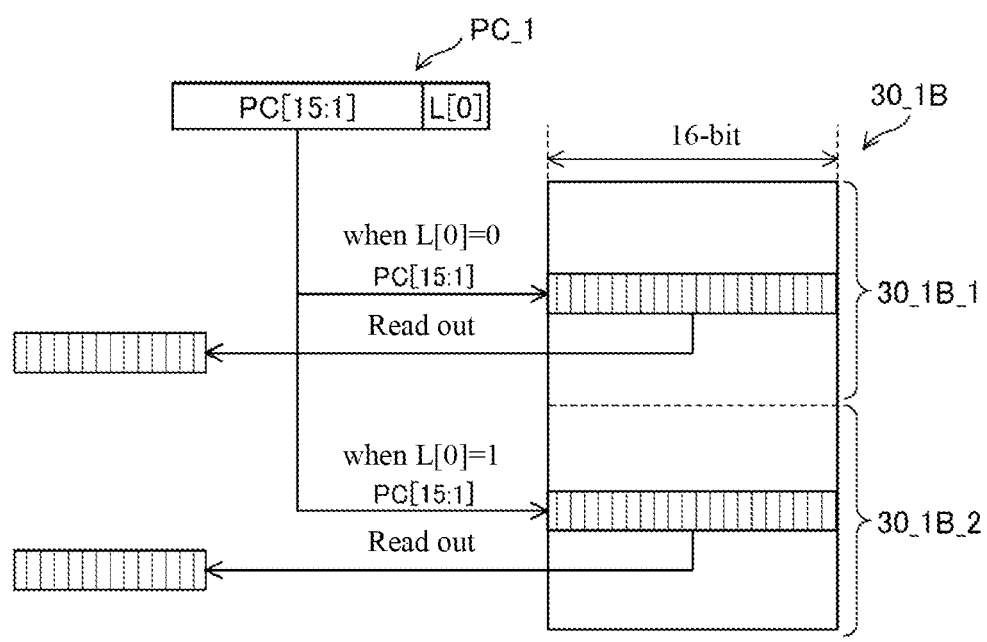
FIG. 9 is a conceptual diagram of actions of reading an instruction from a program memory according to the embodiment (EX_1B) of the present disclosure.

FIG. 9 shows a conceptual diagram of actions of reading an instruction (a read access) from the program memory 30_1B of the embodiment EX_1B. Also referring to FIG. 10, the program counter PC_1 includes bits PC[15] to PC[0], and the denotation "L[i]" indicates the value of the bit PC[i] in the program counter PC_1. In the program counter PC_1, the bit PC[15] is the most significant bit, the bit PC[0] is the least significant bit, and the bit PC[i+1] is higher than the bit PC[i] (where i is any integer). Moreover, as described above, the denotation "PC[15:1]" is used to represent upper 15 bits (that is, a set of the bits PC[15] to PC[1]) in the program counter PC_1.

In the embodiment EX_1B, the program memory 30_1B has a 128-kB memory space MS, and so a read target address is specified and represented by 17 bits. The denotation "ADR_1" is especially used to reference a read target address of the embodiment EX_1B.

Figure 10:
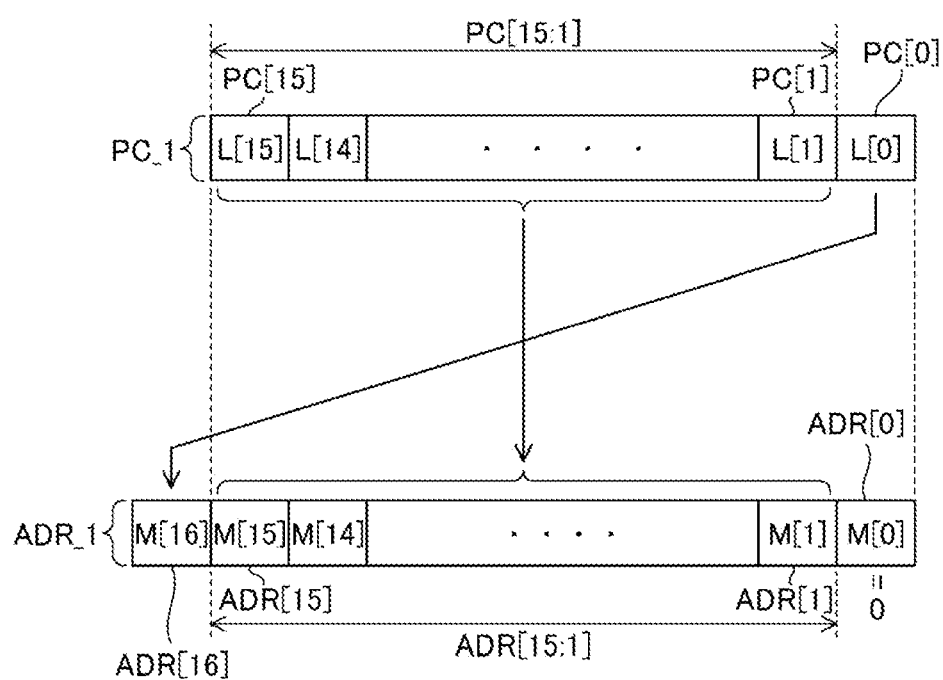
FIG. 10 is a diagram of structures of a program counter and addresses to be read as well as relationships thereof according to the embodiment (EX_1B) of the present disclosure.

FIG. 10 shows a structure of the 16-bit program counter PC_1 and a structure of the 17-bit read target address ADR_1. The read target address ADR_1 includes bits ADR[16] to ADR[0], and the denotation "M[i]" is used in the read target address ADR_1 to represent the value of the bit ADR[i]. In the read target address ADR_1, the bit ADR[16] is the most significant bit, the bit ADR[0] is the least significant bit, and the bit ADR[i+1] is higher than the bit ADR[i] (where i is any integer).

The value M[16] of the most significant bit ADR[16] of the read target address is represented by the value L[0] of the least significant bit PC[0] of the program counter PC_1 (that is to say, it is set that M[16]=L[0]). The value M[0] of the least significant bit ADR[0] of the read target address ADR_1 is fixed at a predetermined value "0". Among the bits of the read target address ADR_1, a total of 15 bits lower than the most significant bit ADR[16] and higher than the least significant bit ADR[0] are bits ADR[15:1]. The values of the bits ADR[15:1] are represented by the values of the upper 15 bits PC[15:1] of the program counter PC_1. That is to say, for each integer i satisfying "1≤i≤15", "M[i]=L[i]" holds true.

Thus, the CPU 20 of the embodiment EX_1B selects either of the first memory area 30_1B_1 and the second memory area 30_1B_2 according to the value L[0] of the least significant bit of the program counter PC_1. Herein, for the sake of convenience, a selected memory area is referred to as a target memory area. As such, in the target memory area, the address corresponding to the values of the upper 15 bits PC[15:1] of the program counter PC_1 is set as the read target address. Moreover, one instruction (2-byte data) starting from the set read target address is read from the program memory 30_1B and sent to the CPU 20. In addition, regarding the program memory 30_1B, the values of a total of 16 bits, excluding the least significant bit, from the bits of the target address ADR_1 must be specified from the CPU 20. A total of 16 wires are disposed in the address bus 41 to perform the specifying above.

For example, a first instance CS_1B in which the value stored in the program counter PC_1 is "0x1234" is considered. In the first instance CS_1B, the read target address ADR_1 becomes "0x01234". In the first instance CS_1B, "L[0]=0", and thus the target memory area becomes the first memory area 30_1B_1. Moreover, the data in the addresses "0x01234" and "0x01235" of the first memory area 30_1B_1 is used as one instruction and read to the CPU 20. That is to say, word data (2-byte data) including 1-byte data at the address "0x01234" and 1-byte data at the address "0x01235" is read out from program memory 30_1B as data of one instruction and sent to the CPU 20.

Moreover, for example, a second instance CS_1B in which the value stored in the program counter PC_1 is "0x1235" is considered. In the second instance CS_1B, the read target address ADR_1 becomes "0x11234". In the second instance CS_1B, "L[0]=1", and thus the target memory area becomes the second memory area 30_1B_2. Moreover, the data in the addresses "0x11234" and "0x11235" of the second memory area 30_1B_2 is used as one instruction and read to the CPU 20. That is to say, word data (2-byte data) including 1-byte data at the address "0x11234" and 1-byte data at the address "0x11235" is read out from program memory 30_1B as data of one instruction and sent to the CPU 20.

Figure 11:
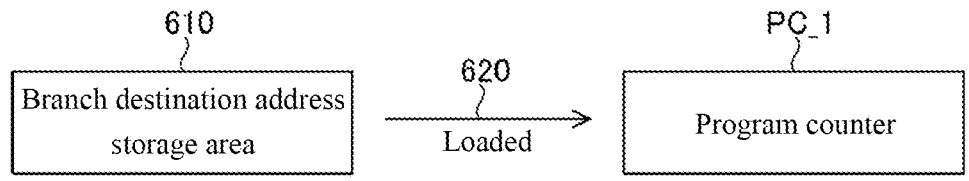
FIG. 11 is a diagram of a situation in which branch destination address specifying data in a branch instruction is loaded into a program counter according to the embodiment (EX_1B) of the present disclosure.

Multiple instructions can be executed by the CPU 20. The multiple instructions include data transmission instructions, branch instructions, arithmetic instructions, bit operation instructions and control instructions. When a branch instruction is executed, as shown in FIG. 11, data 520 stored in the storage area 610 is loaded (transmitted and written) into the program counter PC_1. The storage area 610 is a branch destination address storage area, and the data 620 is branch destination address specifying data. The loading is executed only when a condition specified in a branch instruction is satisfied, or may be executed unconditionally.

The branch destination address storage area 610 is a 16-bit storage area (that is, a storage area having 16 bits), and thus the branch destination address specifying data 620 is 16-bit data. A branch destination address is specified by the branch destination address specifying data 620. Thus, when the branch destination address specifying data 620 is loaded into the program counter PC_1, an address based on the branch destination address specifying data 620 becomes the next read target address ADR_1. As a result, branching is performed to the address based on the branch destination address specifying data 620.

A jump instruction is an example of the branch instruction. In one jump instruction, only when a condition specified in the jump instruction is satisfied, or unconditionally, the data 620 stored in the storage area 610 is loaded into the program counter PC_1. At this point, the storage area 610 is any one of the 16-bit general-purpose storage areas GPR[0]_1 to GRP[7]_1 (FIG. 6), and it is specified in the jump instruction which of the general-purpose storage areas GPR[0]_1 to GRP[7]_1 is to be used as the storage area 610.

A sub-program calling instruction is another example of the branch instruction. In one sub-program calling instruction, the data 620 stored in the storage area 610 is loaded into the program counter PC_1. At this point, the storage area 610 is any one of the 16-bit general-purpose storage areas GPR[0]_1 to GRP[7]_1 (FIG. 6), and it is specified in the sub-program calling instruction which of the general-purpose storage areas GPR[0]_1 to GRP[7]_1 is to be used as the storage area 610. Moreover, when branching is performed through a sub-program calling instruction, the CPU 20 saves (stores) the stored value of the program counter PC_1 immediately before loading the data 620 into the program counter PC_1 in a stack area, and then branches the address. The stack area in the embodiment EX_1B is a 16-bit storage area (that is to say, a storage area having 16 bits). It is possible that the stack area is provided in the data memory 50, or be formed by two registers in the CPU 20.

A return instruction from a sub-program is also a branch instruction. A return instruction from a sub-program is an instruction executed after branching through a sub-program calling instruction. Through a return instruction from a sub-program, the data 620 stored in the storage area 610 is also loaded into the program counter PC_1, with however the storage area 610 at this point being a stack area.

Moreover, an instruction returned from an interrupt also a branch instruction. In the case of an interrupt, a stored value of the program counter PC_1 immediately before the occurrence of the interrupt is saved (stored) in the stack area. The instruction returned from an interrupt prompts the CPU 20 to return to a state before the occurrence of the interrupt. During the returning, the stack area functions as the storage area 610, and the data 620 stored in the storage area 610 is loaded into the program counter PC_1.

When the data 620 in the branch instruction has been loaded (has been transmitted and written) into the program counter PC_1, branching is performed according to the value of the least significant bit of the data 620 to an address of either of the first memory area 30_1B_1 and the second memory area 30_1B_2.

That is to say, the following situation is considered: the data 620 is loaded into the program counter PC_1 by the branch instruction, and as a result of the loading, a value "0" is stored in the least significant bit PC[0] of the program counter PC_1. In this case, branching is performed to the address corresponding to the value of the upper 15 bits of the program counter PC_1 and within the first memory area 30_1B_1.

More specifically, for example, when the data 620 having a value "0x1234" is loaded into the program counter PC_1 by the branch instruction, the value "0" is stored in the least significant bit PC[0] of the program counter PC_1. In this case, the read target address ADR_1 becomes "0x01234", and a next instruction read action is the same as the instruction read action of the first instance CS_1B. When a program designer wishes branching to the address in the first memory area 30_1B_1, the value of the least significant bit of the data 620 is set to "0".

Conversely, the following situation is considered: the data 620 is loaded into the program counter PC_1 by the branch instruction, and as a result of the loading, a value "1" is stored in the least significant bit PC[0] of the program counter PC_1. In this case, branching is performed to the address corresponding to the value of the upper 15 bits of the program counter PC_1 and within the second memory area 30_1B_2.

More specifically, for example, when the data 620 having a value "0x1235" is loaded into the program counter PC_1 by the branch instruction, the value "1" is stored in the least significant bit PC[0] of the program counter PC_1. In this case, the read target address ADR_1 becomes "0x11234", and a next instruction read action is the same as the instruction read action of the second instance CS_1B. When a program designer wishes branching to the address in the second memory area 30_1B_2, the value of the least significant bit of the data 620 is set to "1".

According to the embodiment EX_1B, compared to the means of memory bank switching, the memory space MS can be expanded to 128 kB without increasing a circuit scale. Moreover, a compiler change related to a change from the reference example EX_1A to the embodiment EX_1B also becomes quite simple. Accordingly, instruction efficiency does not deteriorate since memory bank switching is not needed.

Moreover, in upgrading from the configuration of the reference example EX_1A to the configuration of the embodiment EX_1B, the compatibility of an instruction set is maintained. Further details are given below. In the research of modifying the configuration of the reference example EX_1A to the configuration of the embodiment EX_1B, the program designer worries that whether the (binary) program designed for the configuration of the reference example EX_1A can be operated without any problems in the configuration of the embodiment EX_1B. Herein, in the (binary) program designed for the configuration of the reference example EX_1A, the value of the least significant bit of the data 620 should be fixed at "0". Thus, even if the (binary) program designed for the configuration of the reference example EX_1A is operated in the configuration of the embodiment EX_1B, a branch target is limited to be within the 64-kB space from "0x00000" to "0x0fffe", and so the program can be operated without any problems. During the development of a new program of the program designer to implement space expansion after accessing "0x10000", it is studied as to which of "0" and "1" the value of the least significant bit of the data 620 is to be set.

Reference Example EX_2A

Even if the instruction length is not 16 bits, the technique for modifying the configuration of the reference example EX_1A to the configuration of the embodiment EX_1B can still be used. In the reference example EX_2A and an embodiment EX_2B, a situation in which the instruction length is 32 bits is considered. First of all, the reference example EX_2A as a comparison to the embodiment EX_2B to be given below is described. In the reference example EX_2A and the embodiment EX_2B, each instruction executed by the CPU 20 has an instruction length of 32 bits. That is to say, in the reference example EX_2A and the embodiment EX_2B, each instruction executed by the CPU 20 has a length of 32 bits (formed by 32-bit data).

Figure 12:
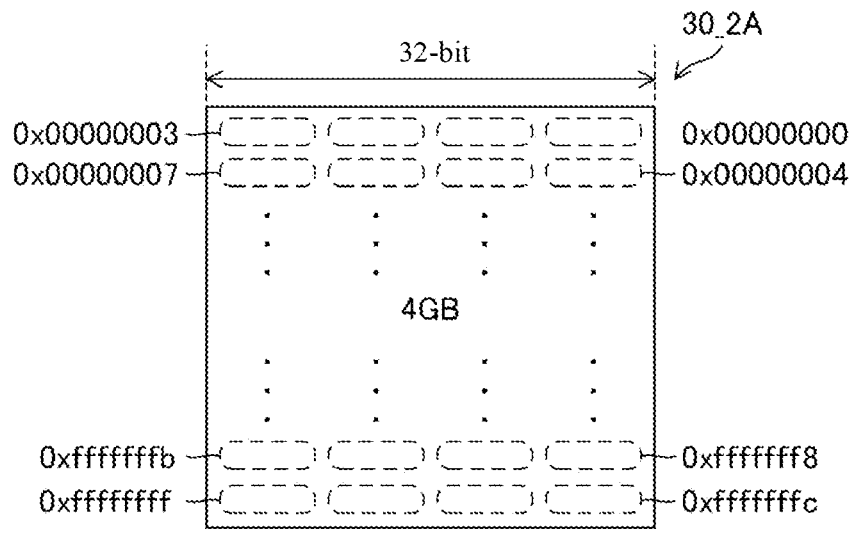
FIG. 12 is a diagram of a configuration of a program memory of a reference example (EX_2A).

The program memory 30 of the reference example EX_2A is especially referred to as a program memory 30_2A. FIG. 12 shows a configuration of the program memory 30_2A. The program memory 30_2A has a memory space MS that is 4 GB at maximum. Herein, the program memory 30_2A is set to have a 4-GB memory space MS. In the program memory 30_2A, the lowest address is "0x00000000", and the highest address is "0xffffffff".

Corresponding to the 32-bit instruction length of each instruction, a data length of a word as a unit for accessing the program memory 30_2A is 32 bits (a 32-bit length). That is to say, the CPU 20 of the reference example EX_2A one-time reads 32-bit data from the program memory 30_2A to read one instruction to be executed next. Thus, in the reference example EX_2A, the data bus 42 is formed by 32 lines.

Figure 13:
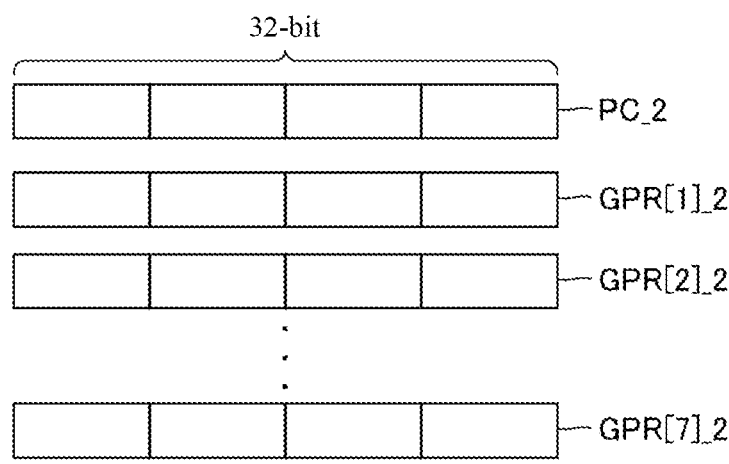
FIG. 13 is a diagram of a program counter and multiple general-purpose storage areas of the reference example (EX_2A) and an embodiment (EX_2B) of the present disclosure.

Referring to FIG. 13, the denotation "PC_2" is used to reference the program counter PC of the reference example EX_2A and the embodiment EX_2B. In the reference example EX_2A and the embodiment EX_2B, the program counter PC_2 is formed by a combination of four registers provided in the CPU 20. Corresponding to the 32-bit instruction length of each instruction, each time the CPU 20 executes one instruction, 4 is added to the value of the program counter PC_2 (however, except for branch instructions).

The denotation "GPR[i]_2" is used to reference a general-purpose storage area GPR[i] of the reference example EX_2A and the embodiment EX_2B (where i is an integer). In the reference example EX_2A and the embodiment EX_2B, each general-purpose storage area is s formed by a combination of four registers.

As described above, each of the registers provided in the CPU 20 is an 8-bit register (that is to say, a register having an 8-bit storage area). Thus, each of the program counter PC_2 and the general-purpose storage areas GPR[0]_2 to GRP[7]_2 has a 32-bit storage area.

Figure 14:
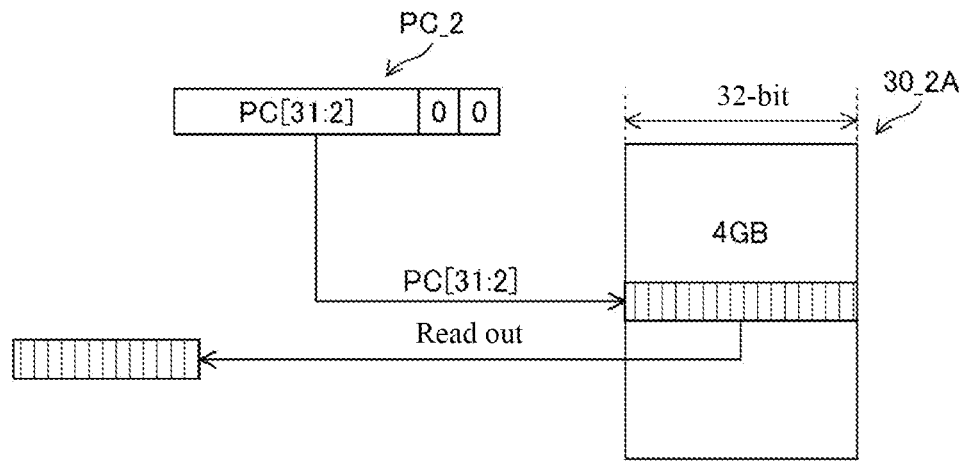
FIG. 14 is a conceptual diagram of actions of reading an instruction from a program memory of the reference example (EX_2A).

FIG. 14 shows a conceptual diagram of actions of reading an instruction (a read access) from a program memory 30_2A of the reference example EX_2A. The denotation "PC[31:2]" is used to represent upper 30 bits in the program counter PC_2. In the reference example EX_2A, a read target address is specified and represented by 32 bits. In the reference example EX_2A, an instruction is read in a unit of 32 bits (that is to say, in a unit of 4 bytes), and thus lower 2 bits (the least significant bit and the second least significant bit) of the program counter PC_2 are always fixed at "0". That is to say, upper 30 bits of the read target address are specified by the values of upper 30 bits of the program counter PC_2, and the values of the lower 2 bits (the least significant bit and the second least significant bit) of the read target address are always "0".

For example, if the values of the upper 30 bits of the program counter PC_2 are all "0", the read target address is "0x00000000". At this point, a total of 4 bytes of data starting from the address "0x00000000", that is, a total of 4 bytes of data from the address "0x00000000" to the address "0x00000003", is read from program memory 30_2A as data of one instruction and sent to the CPU 20.

Alternatively, if the values of the upper 30 bits of the program counter PC_2 are all "1", the read target address is "0xfffffffc". At this point, a total of 4 bytes of data starting from the address "0xfffffffc", that is, a total of 4 bytes of data from the address "0xfffffffc" to the address "0xffffffff", is read from program memory 30_2A as data of one instruction and sent to the CPU 20.

Embodiment EX_2B

The embodiment EX_2B is described below. In the embodiment EX_2B, the reference example EX_2A is used as a reference, and the memory space MS is expanded to 16 GB without involving memory bank switching.

Figure 15:
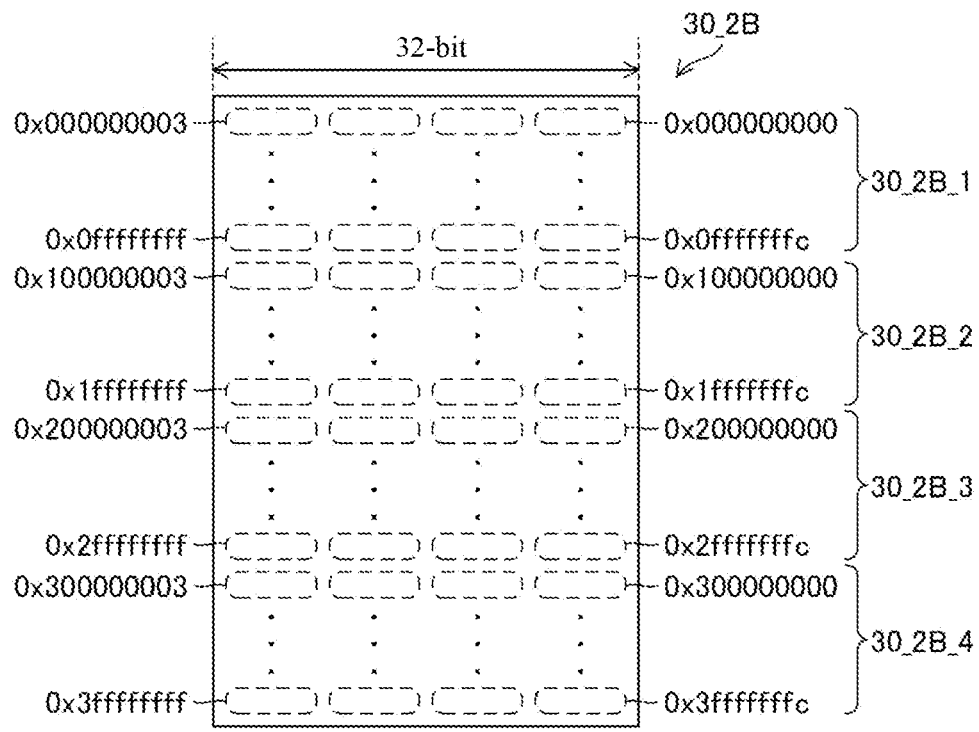
FIG. 15 is a diagram of a configuration of a program memory according to an embodiment (EX_2B) of the present disclosure.

The program memory 30 of the embodiment EX_2B is especially referred to as a program memory 30_2B. FIG. 15 shows a configuration of the program memory 30_2B. The program memory 30_2B has a memory space MS that is 16 GB at maximum. Herein, the program memory 30_2B is set to have a 16-GB memory space MS. In the program memory 30_2B, the lowest address is "0x000000000", and the highest address is "0x3ffffffff".

The program memory 30_2B is configured to include a first memory area 30_2B_1, a second memory area 30_2B_2, a third memory area 30_2B_3 and a fourth memory area 30_2B_4. Each of the memory areas is a 4-GB storage area associated with consecutive addresses. If it is considered that the instruction is formed by J bits (32 bits herein), 4 GB are equivalent to $2^J$ bytes. An $(i-1)^{th}$ memory area is associated with addresses higher than an $i^{th}$ memory area. More specifically, the first memory area 30_2B_1 is a 4-GB memory area from the address "0x000000000" to the address "0x0ffffffff", the second memory area 30_2B_2 is a 4-GB memory area from the address "0x100000000" to the address "0x1ffffffff", the third memory area 30_2B_3 is a 4-GB memory area from the address "0x200000000" to the address "0x2ffffffff", and the fourth memory area 30_2B_4 is a 4-GB memory area from the address "0x300000000" to the address "0x3ffffffff".

Corresponding to the 32-bit instruction length of each instruction, a data length of a word as a unit for accessing the program memory 30_2B is 32 bits (a 32-bit length). That is to say, the CPU 20 of the embodiment EX_2B one-time reads 32-bit data from the program memory 30_2B to read one instruction to be executed next. Thus, in the embodiment EX_2B, the data bus 42 is formed by 32 lines.

Moreover, corresponding to the 32-bit instruction length of each instruction, each time the CPU 20 executes one instruction, 4 is added to the value of the program counter PC_2. However, when the CPU 20 executes the branch instruction, the value according to the branch instruction is substituted into the program counter PC_2.

Figure 16:
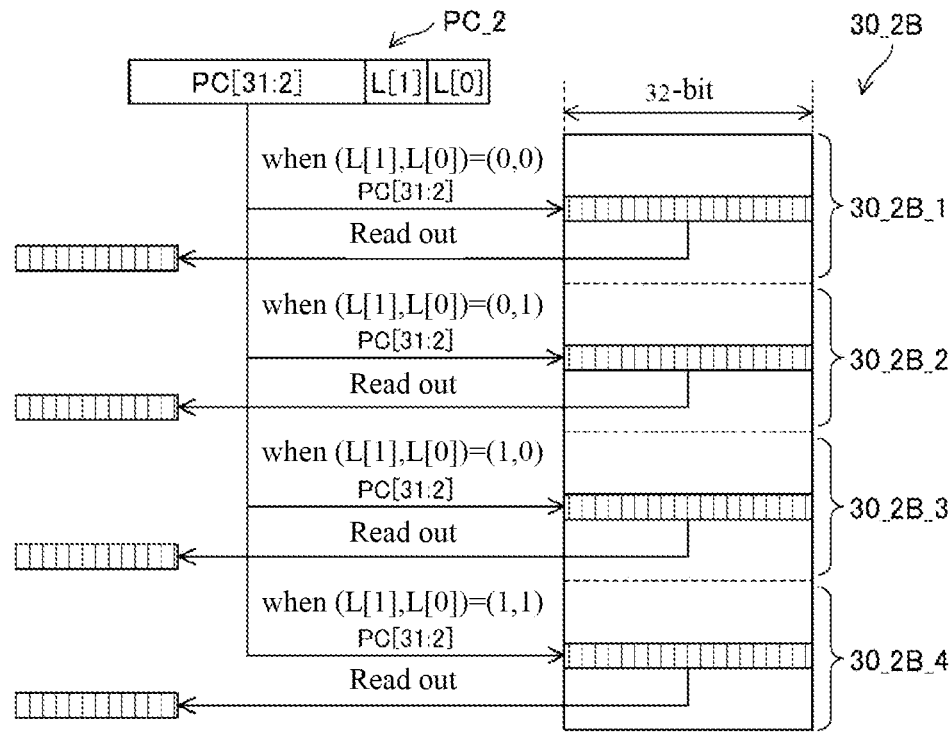
FIG. 16 is a conceptual diagram of actions of reading an instruction from a program memory according to the embodiment (EX_2B) of the present disclosure.

FIG. 16 shows a conceptual diagram of actions of reading an instruction (a read access) from the program memory 30_2B of the embodiment EX_2B. Also referring to FIG. 17, the program counter PC_2 includes bits PC[31] to PC[0], and the denotation "L[i]" indicates the value of the bit PC[i] in the program counter PC_2. In the program counter PC_2, the bit PC[31] is the most significant bit, the bit PC[0] is the least significant bit, and the bit PC[i+1] is higher than the bit PC[i] (where i is any integer). Moreover, as described above, the denotation "PC[31:2]" is used to represent upper 30 bits (that is, a set of the bits PC[31] to PC[2]) in the program counter PC_2.

In the embodiment EX_2B, the program memory 30_2B has a 16-GB memory space MS, and so a read target address is specified and represented by 34 bits. The denotation "ADR_2" is especially used to reference a read target address of the embodiment EX_2B.

Figure 17:
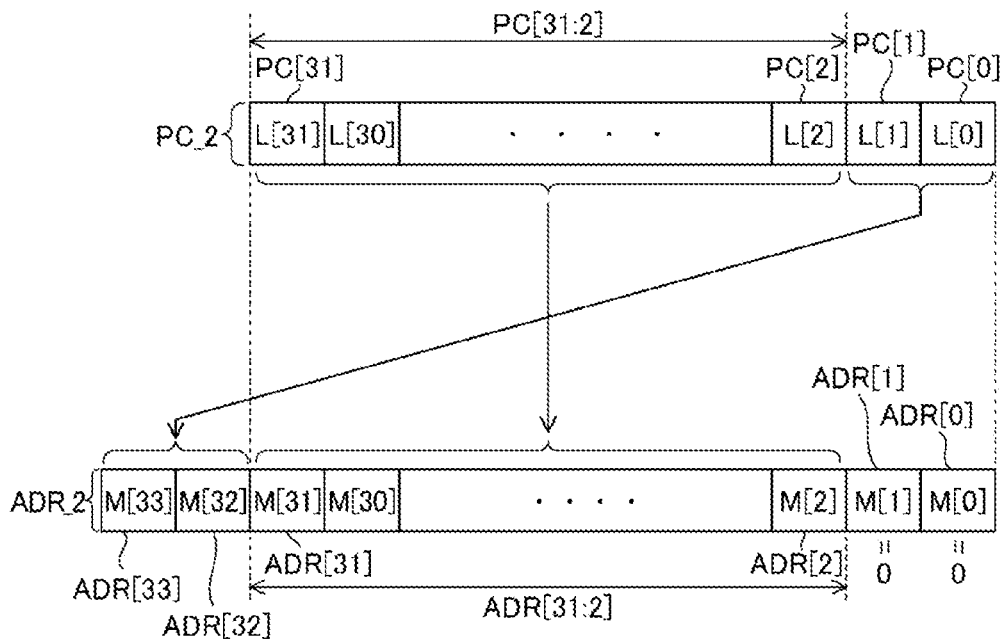
FIG. 17 is a diagram of structures of a program counter and addresses to be read as well as relationships thereof according to the embodiment (EX_2B) of the present disclosure.

FIG. 17 shows a structure of the 32-bit program counter PC_2 and a structure of the 34-bit read target address ADR_2. The read target address ADR_2 includes bits ADR[33] to ADR[0], and the denotation "M[i]" is used in the read target address ADR_2 to represent the value of the bit ADR[i]. In the read target address ADR_2, the bit ADR[33] is the most significant bit, the bit ADR[0] is the least significant bit, and the bit ADR[i+1] is higher than the bit ADR[i] (where i is any integer).

Among the bits of the read target address ADR_2, the values of the upper 2 bits ADR[33] and ADR[32] are represented by the values of the lower 2 bits PC[1] and PC[0] of the program counter PC_2. That is to say, "M[33]=L[1]" and "M[32]=L[0]".

Among the bits of the read target address ADR_2, the values of the lower 2 bits ADR[1] and ADR[0] are fixed at a predetermined value "0". That is to say, it is fixed that "M[1]=M[0]=0".

Among the bits of the read target address ADR_2, a total of 30 bits lower than the upper 2 bits ADR[33] and ADR[32] and higher than the lower 2 bits ADR[1] and ADR[0] are the bits ADR[31:2]. The values of the bits ADR[31:2] are represented by the values of the upper 30 bits PC[31:2] of the program counter PC_2. That is to say, for each integer i satisfying "2≤i≤31", "M[i]=L[i]" holds true.

Thus, the CPU 20 of the embodiment EX_2B selects any one of the memory areas 30_2B_1 to 30_2B_4 according to the values L[1] and L[0] of the lower 2 bits of the program counter PC_2. Herein, for the sake of convenience, a selected memory area is referred to as a target memory area. As such, in the target memory area, the address corresponding to the values of the upper 30 bits PC[31:2] of the program counter PC_2 are set as the read target address. Moreover, one instruction (4-byte data) starting from the set read target address is read from the program memory 30_2B and sent to the CPU 20. In addition, regarding the program memory 30_2B, the values of a total of 32 bits, excluding the lower 2 bits (ADR[1] and ADR[0]), from the bits of the target address ADR_1 must be specified from the CPU 20.

A total of 32 wires are disposed in the address bus 41 to perform the specifying above.

Figure 18:
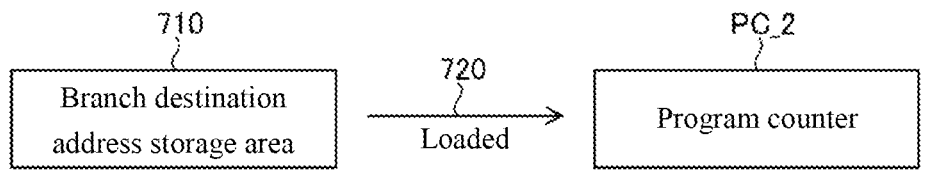
FIG. 18 is a diagram of a situation in which branch destination address specifying data in a branch instruction is loaded into a program counter according to the embodiment (EX_2B) of the present disclosure.

As described above, multiple instructions can be executed by the CPU 20, wherein the multiple instructions include data transmission instructions, branch instructions, arithmetic instructions, bit operation instructions and control instructions. In the configuration of the embodiment EX_2B, when a branch instruction is executed, as shown in FIG. 18, data 720 stored in the storage area 710 is loaded (transmitted and written) into the program counter PC_2. The storage area 710 is a branch destination address storage area, and the data 720 is branch destination address specifying data. The loading is executed only when a condition specified in a branch instruction is satisfied, or may be executed unconditionally.

The branch destination address storage area 710 is a 32-bit storage area (that is, a storage area having 32 bits), and thus the branch destination address specifying data 720 is 32-bit data. A branch destination address is specified by the branch destination address specifying data 720. Thus, when the branch destination address specifying data 720 is loaded into the program counter PC_2, an address based on the branch destination address specifying data 720 becomes the next read target address. As a result, branching is performed to the address based on the branch destination address specifying data 720.

A jump instruction is an example of the branch instruction. In one jump instruction, only when a condition specified in the jump instruction is satisfied, or unconditionally, the data 720 stored in the storage area 710 is loaded into the program counter PC_2. At this point, the storage area 710 is any one of the 32-bit general-purpose storage areas GPR[0]_2 to GRP[7]_2 (FIG. 13), and it is specified in the jump instruction which of the general-purpose storage areas GPR[0]_2 to GRP[7]_2 is to be used as the storage area 710.

A sub-program calling instruction is another example of the branch instruction. In one sub-program calling instruction, the data 720 stored in the storage area 710 is loaded into the program counter PC_2. At this point, the storage area 710 is any one of the 32-bit general-purpose storage areas GPR[0]_2 to GRP[7]_2 (FIG. 13), and it is specified in the sub-program calling instruction which of the general-purpose storage areas GPR[0]_2 to GRP[7]_2 is to be used as the storage area 710. Moreover, when branching is performed through a sub-program calling instruction, the CPU 20 saves (stores) the stored value of the program counter PC_2 immediately before loading the data 720 into the program counter PC_2 in a stack area, and then branches the address. The stack area in the embodiment EX_2B is a 32-bit storage area (that is to say, a storage area having 32 bits). It is possible that the stack area is provided in the data memory 50, or be formed by four registers in the CPU 20.

A return instruction from a sub-program is also a branch instruction. A return instruction from a sub-program is an instruction executed after branching through a sub-program calling instruction. Through a return instruction from a sub-program, the data 720 stored in the storage area 710 is also loaded into the program counter PC_2, with however the storage area 710 at this point being a stack area.

Moreover, an instruction returned from an interrupt also a branch instruction. In the case of an interrupt, a stored value of the program counter PC_2 immediately before the occurrence of the interrupt is saved (stored) in the stack area. The instruction returned from an interrupt prompts the CPU 20 to return to a state before the occurrence of the interrupt. During the returning, the stack area functions as the storage area 710, and the data 720 stored in the storage area 710 is loaded into the program counter PC_2.

When the data 720 in the branch instruction has been loaded (has been transmitted and written) into the program counter PC_2, branching is performed according to the values of the lower 2 bits of the data 720 to an address of any one of the memory areas 30_2B_1 to 30_2B_4. The lower 2 bits of the data 720 refer to the lowest bit (that is, the least significant bit) and the second lowest bit (the second least significant bit following the least significant bit) among the bits of the data 720.

For example, the following situation is considered: the data 720 is loaded into the program counter PC_2 by the branch instruction, and as a result of the loading, values "0" are respectively stored in the bits PC[1] and PC[0] of the program counter PC_2. In this case, branching is performed to the address corresponding to the values of the upper 30 bits [31:2] of the program counter PC_2 and within the first memory area 30_2B_1. That is to say, for example, when the data 720 having a value "0x12345670" is loaded into the program counter PC_2 by the branch instruction, the values "0" are respectively stored in the bits PC[1] and PC[0] of the program counter PC_2. As such, the read target address ADR_2 becomes an address in the first memory area 30_2B_1, and branching is performed to the address in the first memory area 30_2B_1 according to the data 720.

Moreover, for example, the following situation is considered: the data 720 is loaded into the program counter PC_2 by the branch instruction, and as a result of the loading, values "0" and "1" are respectively stored in the bits PC[1] and PC[0] of the program counter PC_2. In this case, branching is performed to the address corresponding to the values of the upper 30 bits [31:2] of the program counter PC_2 and within the second memory area 30_2B_2. That is to say, for example, when the data 720 having a value "0x12345671" is loaded into the program counter PC_2 by the branch instruction, the values "0" and "1" are respectively stored in the bits PC[1] and PC[0] of the program counter PC_2. As such, the read target address ADR_2 becomes an address in the second memory area 30_2B_2, and is branched to the address in the second memory area 30_2B_2 according to the data 720.

For example, the following situation is considered: the data 720 is loaded into the program counter PC_2 by the branch instruction, and as a result of the loading, values "1" and "0" are respectively stored in the bits PC[1] and PC[0] of the program counter PC_2. In this case, branching is performed to the address corresponding to the values of the upper 30 bits [31:2] of the program counter PC_2 and within the third memory area 30_2B_3. That is to say, for example, when the data 720 having a value "0x12345672" is loaded into the program counter PC_2 by the branch instruction, the values "1" and "0" are respectively stored in the bits PC[1] and PC[0] of the program counter PC_2. As such, the read target address ADR_2 becomes an address in the third memory area 30_2B_3, and is branched to the address in the third memory area 30_2B_3 according to the data 720.

For example, the following situation is considered: the data 720 is loaded into the program counter PC_2 by the branch instruction, and as a result of the loading, values "1" are respectively stored in the bits PC[1] and PC[0] of the program counter PC_2. In this case, branching is performed to the address corresponding to the values of the upper 30 bits [31:2] of the program counter PC_2 and within the fourth memory area 30_2B_4. That is to say, for example, when the data 720 having a value "0x12345673" is loaded into the program counter PC_2 by the branch instruction, the values "1" are respectively stored in the bits PC[1] and PC[0] of the program counter PC_2. As such, the read target address ADR_2 becomes an address in the fourth memory area 30_2B_4, and is branched to the address in the fourth memory area 30_2B_4 according to the data 720.

Moreover, it is considered that "(M[33], M[32])=(L[1], L[0])" holds true. Herein (referring to FIG. 17), or the above may be modified to "(M[33], M[32])=(L[1], L[0])".

Embodiment EX_3B

An embodiment EX_3B is described below. The denotation "J" is used to represent the instruction length of each instruction executed by the CPU 20. That is to say, each instruction executed by the CPU 20 has a length of J bits (formed by J-bit data). Herein, $$J=16\times 2^{n-1}$$

holds true, where n is any desired natural number, and $2^{n-1}$ represents 2 raised to the $(n-1)^{th}$ power. For example, "J=16" when "n=1", and "J=32" when "n=2". The method for expanding the memory space MS when "n=1" is shown in embodiment EX_1B, and the method for expanding the memory space MS when "n=2" is shown in the embodiment EX_2B. Moreover, the method for expanding the memory space MS when the value of n is generalized is shown in the embodiment EX_3B.

Figure 19:
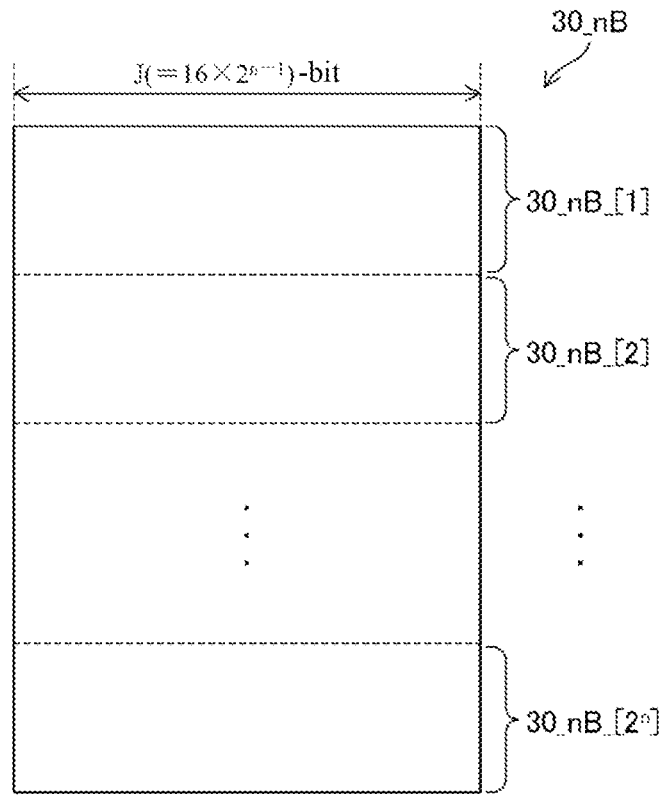
FIG. 19 is a diagram of a configuration of a program memory according to an embodiment (EX_3B) of the present disclosure.

The program memory 30 of the embodiment EX_3B is especially referred to as a program memory 30_nB. FIG. 19 shows a configuration of the program memory 30_nB. The program memory 30_nB has a memory space MS of a specified size.

Corresponding to the J-bit instruction length of each instruction, a data length of a word as a unit for accessing the program memory 30_nB is J bits (a J-bit length). That is to say, the CPU 20 of the embodiment EX_3B one-time reads J-bit data from the program memory 30_nB to read one instruction to be executed next. Thus, in the embodiment EX_3B, the data bus 42 is formed by J lines.

The program memory 30_nB has a total of $2^n$ memory areas. The total of $2^n$ memory areas are first to $(2^n)^{th}$ memory areas, where $2^n$ represents 2 raised to the $n^{th}$ power. The denotation "30_nB_[j]" is used to represent a $j^{th}$ memory area of the program memory 30_nB (where j is an integer). In the program memory 30_nB, each of the memory areas is a storage area having a predetermined size and associated with consecutive addresses. In the program memory 30_nB, the $(i+1)^{th}$ memory area is associated with addresses higher than the $i^{th}$ memory area. Each of the memory areas in the program memory 30_nB has a $2^J$-byte storage area.

The denotation "PC_n" is used to reference the program counter PC of the embodiment EX_3B. The program counter PC_n has a J-bit storage area. The program counter PC_n is formed by a combination of multiple registers provided in the CPU 20. Corresponding to the J-bit instruction length of each instruction, each time the CPU 20 executes one instruction, "$2^n$" is added to the value of the program counter PC. However, when the CPU 20 executes the branch instruction, the value according to the branch instruction is substituted into the program counter PC_n.

Figure 20:
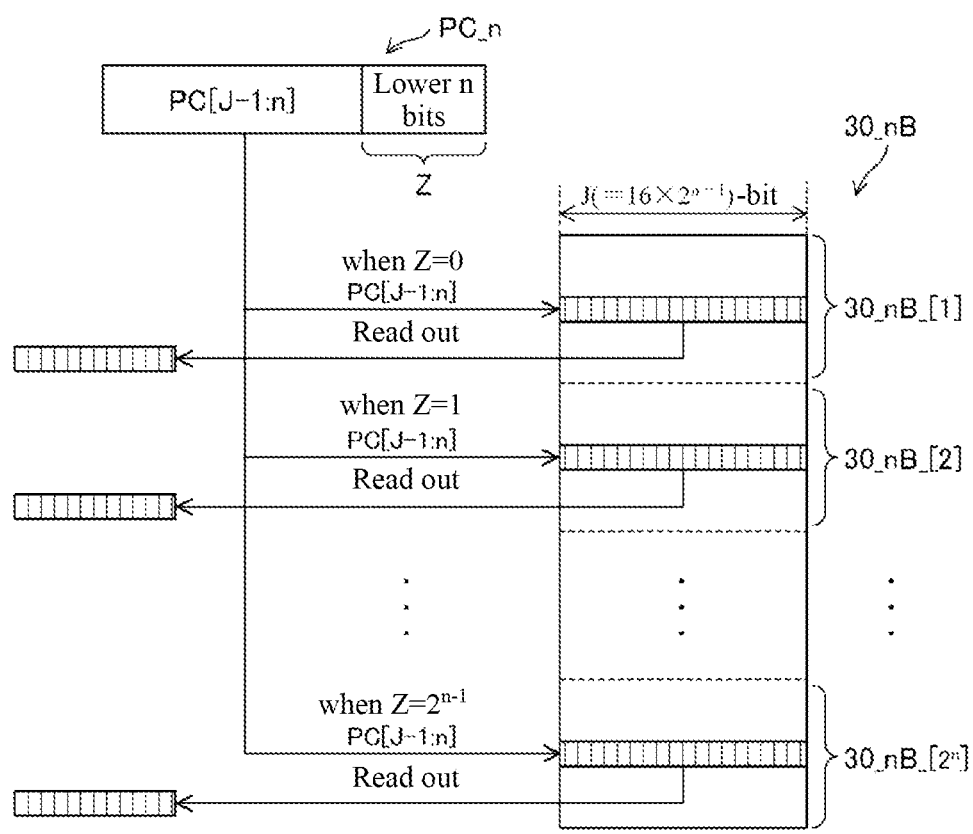
FIG. 20 is a conceptual diagram of actions of reading an instruction from a program memory according to the embodiment (EX_3B) of the present disclosure.

FIG. 20 shows a conceptual diagram of actions of reading an instruction (a read access) from a program memory 30_nB of the embodiment EX_3B. Moreover, the meaning of the denotation "Z" in FIG. 20 will become more apparent according to the description below. Also referring to FIG. 21, the program counter PC_n includes bits PC[J−1] to PC[0], and the denotation "L[i]" indicates the value of the bit PC[i] in the program counter PC_n. In the program counter PC_n, the bit PC[J−1] is the most significant bit, the bit PC[0] is the least significant bit, and the bit PC[i+1] is higher than the bit PC[i] (where i is any integer). Moreover, the denotation "PC[J−1:n]" is used to represent upper (J−n) bits (that is, a set of the bits PC[j−1] to PC[n]) in the program counter PC_n.

In the embodiment EX_3B, the read target address is designated and represented by (J+n) bits. In particular, the address to be read in the embodiment EX_3B is referred to by the notation "ADR_n".

Figure 21:
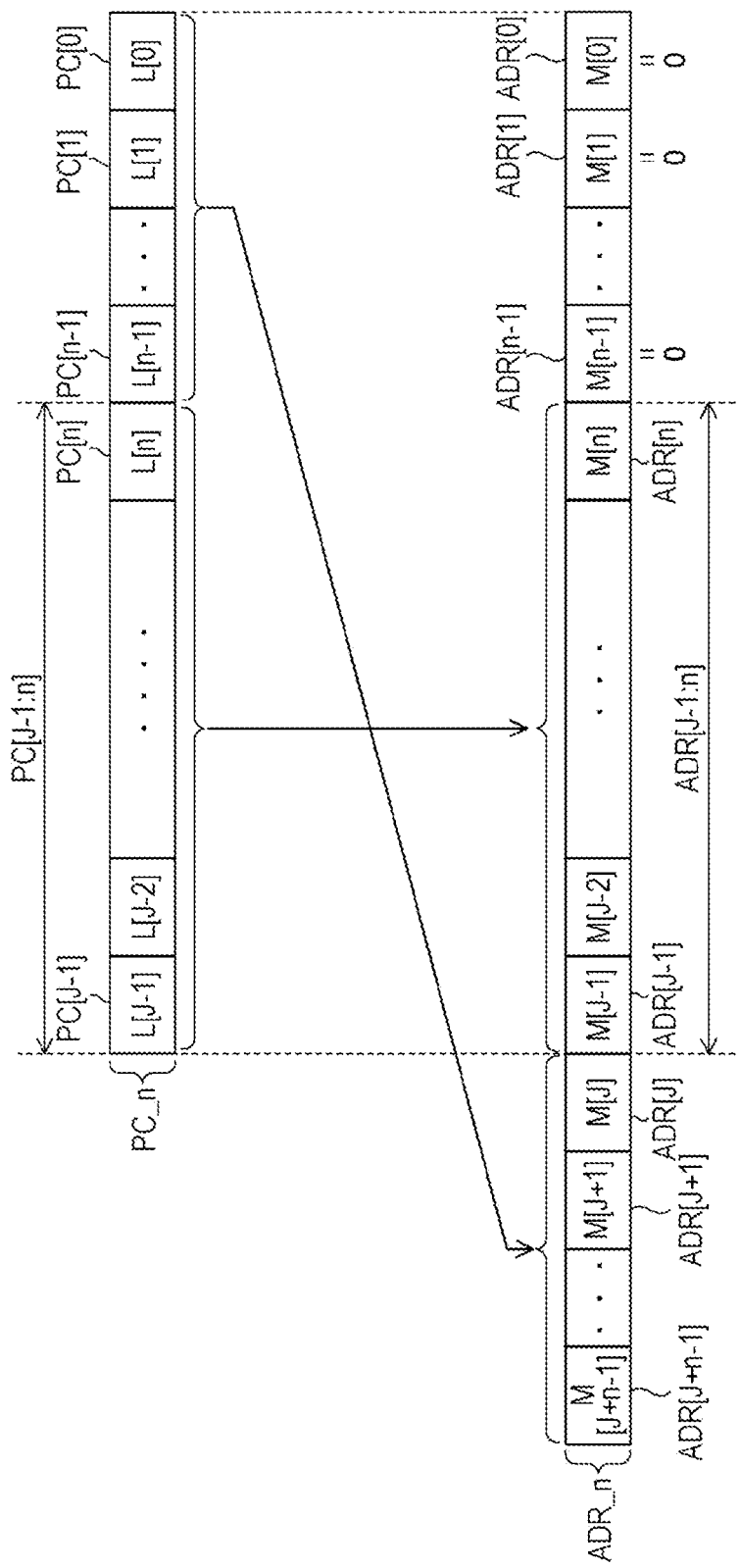
FIG. 21 is a diagram of structures of a program counter and addresses to be read as well as relationships thereof according to the embodiment (EX_3B) of the present disclosure.

FIG. 21 shows a structure of the (J+n)-bit program counter PC_n and a structure of the read target address ADR_n. The read target address ADR_n includes bits ADR[J+n−1] to ADR[0], and the denotation "M[i]" is used in the read target address ADR_n to represent the value of the bit ADR[i]. In the read target address ADR_n, the bit ADR[J+n−1] is the most significant bit, the bit ADR[0] is the least significant bit, and the bit ADR[i+1] is higher than the bit ADR[i] (where i is any integer).

The values of upper n bits of the read target address ADR_n are represented by the values of lower n bits in the program counter PC_n. Herein, the upper n bits of the read target address ADR_n refer to a total of n bits including the most significant bit and bits consecutive from the most significant bit among the bits of the read target address ADR_n, and are thus the bits ADR[J+1−1] to ADR[J]. The lower n bits in the program counter PC_n refer to a total of n bits including, the least significant bit and bits consecutive from the least significant bit among the bits in the program counter PC_n, and are thus the bits PC[n−1] to PC[0]. The values M[J+n−1] to M[J] are respectively consistent with the values L[n−1] to L[0]. For example, when "n=3", "(M[66], M[65], M[64])=(L[2], L[1], L[0])".

The values of the lower n bits of the read target address ADR_n are fixed at a predetermined value "0". Herein, the lower n bits of the read target address ADR_n refer to a total of n bits including the least significant bit and bits consecutive from the least significant bit among the bits of the read target address ADR_n, and are thus the bits ADR[n−1] to ADR[0]. Thus, the values M[n−1] to M[0] are all fixed at "0".

Among the bits of the read target address ADR_n, a total of (J−n) bits that are lower than the upper n bits (ADR[J+n−1] to ADR[J]) and higher than the lower 2 bits (ADR[n−1] to ADR[0]) are the bits ADR[J−1:n]. The values of the bits ADR[J−1:n] are represented by the values of the upper (J−n) bits of the program counter PC_n. The upper (J−n) bits of the program counter PC_n are the bits PC[J−1:n]. That is to say, for each integer i satisfying "1≤i≤J−1", "M[i]=L[i]" holds true.

Thus, the CPU 20 of the embodiment EX_3B selects any one of the memory areas 30_nB_[1] to 30_nB[$2^n$] according to the values L[n−1] and L[0] of the lower n bits of the program counter PC_n. Herein, for the sake of convenience, a selected memory area is referred to as a target memory area. As such, in the target memory area, the address corresponding to the values of the upper (J−n) bits of the program counter PC_n, that is, the address corresponding to the values L[J−1] to L[n] of the bits PC[J−1] to PC[n], is set as the read target address. Moreover, one instruction ($2^n$-byte data) starting from the set read target address is read from the program memory 30_nB and sent to the CPU 20. In addition, regarding the program memory 30_nB, the values of a total of J bits, excluding the lower n bits (ADR[n−1] and ADR[0]), from the bits of the target address ADR_n, must be specified from the CPU 20. A total of J wires are disposed in the address bus 41 to perform the specifying above.

Figure 22:
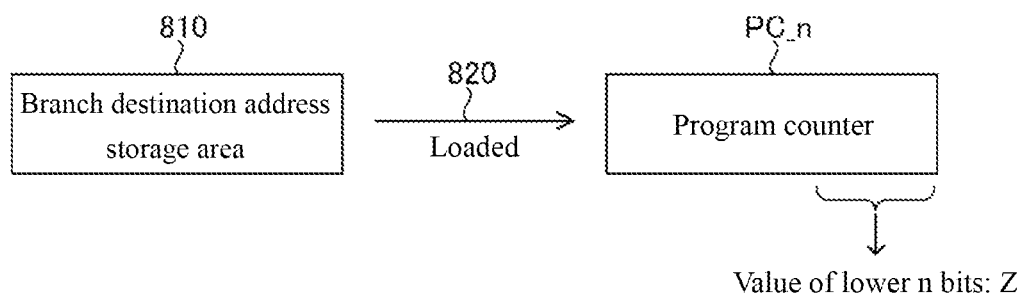
FIG. 22 is a diagram of a situation in which a branch destination address specifying data in a branch instruction is loaded into a program counter according to the embodiment (EX_3B) of the present disclosure.

As described above, multiple instructions can be executed by the CPU 20, wherein the multiple instructions include data transmission instructions, branch instructions, arithmetic instructions, bit operation instructions and control instructions. In the configuration of the embodiment EX_3B, when a branch instruction is executed, as shown in FIG. 22, data 820 stored in a storage area 810 is loaded (transmitted and written) into the program counter PC_n. The storage area 810 is a branch destination address storage area, and the data 820 is branch destination address specifying data. The loading is executed only when a condition specified in a branch instruction is satisfied, or may be executed unconditionally.

The branch destination address storage area 810 is a J-bit storage area (that is, a storage area having J bits), and thus the branch destination address specifying data 820 is J-bit data. A branch destination address is specified by the branch destination address specifying data 820. Thus, when the branch destination address specifying data 820 is loaded into the program counter PC_n, an address based on the branch destination address specifying data 820 becomes the next read target address. As a result, branching is performed to the address based on the branch destination address specifying data 820.

A jump instruction is an example of the branch instruction. In one jump instruction, only when a condition specified in the jump instruction is satisfied, or unconditionally, the data 820 stored in the storage area 810 is loaded into the program counter PC_n. At this point, the storage area 810 is any one of the J-bit general-purpose storage areas GPR[0] to GRP[7], and it is specified in the jump instruction which of the general-purpose storage areas GPR[0] to GRP[7] is to be used as the storage area 810.

A sub-program calling instruction is another example of the branch instruction. In one sub-program calling instruction, the data 820 stored in the storage area 810 is loaded into the program counter PC_n. At this point, the storage area 810 is any one of the J-bit general-purpose storage areas GPR[0] to GRP[7], and it is specified in the sub-program calling instruction which of the general-purpose storage areas GPR[0] to GRP[7] is to be used as the storage area 810. Moreover, when branching is performed through a sub-program calling instruction, the CPU 20 saves (stores) the stored value of the program counter PC_n immediately before loading the data 820 into the program counter PC_n in a stack area, and then branches the address. The stack area in the embodiment EX 3B is a J-bit storage area (that is to say, a storage area having J bits). It is possible that the stack area is provided in the data memory 50, or be formed by multiple registers in the CPU 20.

A return instruction from a sub-program is also a branch instruction. A return instruction from a sub-program is an instruction executed after branching through a sub-program calling instruction. Through a return instruction from a sub-program, the data 820 stored in the storage area 810 is also loaded into the program counter PC_n, with however the storage area 810 at this point being a stack area.

Moreover, an instruction returned from an interrupt also a branch instruction. In the case of an interrupt, a stored value of the program counter PC_n immediately before the occurrence of the interrupt is saved (stored) in the stack area. The instruction returned from an interrupt prompts the CPU 20 to return to a state before the occurrence of the interrupt. During the returning, the stack area functions as the storage area 810, and the data 820 stored in the storage area 810 is loaded into the program counter PC_n.

When the data 820 in the branch instruction has been loaded (has been transmitted and written) into the program counter PC_n, branching is performed according to the values of the lower n bits of the data 820 to an address of any one of the memory areas 30_nB_[1] to 30_nB_[$2^n$]. The lower n bits of the data 820 refer to n bits including the least significant bit and bits consecutive from the least significant bit among the bits of the data 820.

Herein, the denotation "Z" is used to represent the values of the lower n bits of the program counter PC_n. The value Z is one single value represented by the lower n bits of the program counter PC_n, that is, a total of n bits PC[n−1] to PC[0]. For example, when "n=2", the value Z is represented by 2 bits, and thus represents an integer value of 0 or more or 3 or less; when "n=3", the value Z is represented by 3 bits, and thus represents an integer value or 0 or more and 7 or less. That is to say, the value Z is any one of the $1^{st}$ value to the $(2^n)^{th}$ value. The first value to the $(2^n)^{th}$ value are different values from one another. For example, when "n=2", the first value to the $(2^n)^{th}$ value are the $1^{st}$ value to the $4^{th}$ value, which are respectively 0 to 3. Or, for example, when "n=3", the $1^{st}$ value to the $(2^n)^{th}$ value are the $1^{st}$ value to the $8^{th}$ value, which are respectively 0 to 7.

The value Z may be a value stored in the lower n bits of the program counter PC_n by loading the data 820 to the program counter PC_n in the branch instruction. A situation where the value Z and the $k^{th}$ value are consistent by the branch instruction. That is to say, the following situation is considered: the value Z stored to the lower n bits of the program counter PC_n by loading the data 820 into the program counter PC_n in the branch instruction is consistent with the $k^{th}$ value. Herein, k is an integer or 1 or more and $2^n$ or less.

In this case, branching is performed to the address (that is, the address corresponding to the values L[J−1] to L[n]) corresponding to the values of the upper (J−n) bits of the program counter PC_n and within the $k^{th}$ memory area 30_nB_[k].

Moreover, it is considered herein that the value M[J+n+n−1] to M[J] are respectively consistent with the values L[n−1] to L[0] (referring to FIG. 21), with however the correspondence between the values M[J+n−1] to M[J] and the values L[n−1] to L[0] being variable. For example, when "n=3", it may be that "(M[66], M[65], M[64])=(L[2], L[1], L[0])", or it may be that "(M[66], M[65], M[64])=(L[0], L[1], L[2])".

Embodiment EX_4B

An embodiment EX_4B is described below.

The circuit elements forming the computing device 10 are as a semiconductor integrated circuit, and a semiconductor device is formed by packaging the semiconductor integrated circuit in a housing (package) formed by a resin. However, multiple discrete components may also be used to form circuits equivalent to the circuits in the computing device 10.

The CPU 20 is assumed to be an arithmetic processing circuit that performs arithmetic operations in a unit of 8 bits; however, the CPU 20 may be an arithmetic processing circuit that performs arithmetic operations in a unit of bits other than 8 bits (for example, 16 bits or 32 bits).

Various modifications may be made to the embodiments of the present disclosure within the scope of the technical concept of the claims. The embodiments above are only examples of possible implementations of the present disclosure, and the meanings of the terms of the present disclosure or the constituting components are not limited to the meanings of the terms used in the embodiments above. The specific numerical values used in the description are only examples, and these numerical values may be modified to various other numerical values.

Note

A note is attached to the present application to show specific configuration examples of the embodiments above.

A computing device (referring to embodiment EX_1B, and FIG. 8 to FIG. 11) according to an aspect of the present disclosure is configured (a first configuration) to include: an arithmetic processing circuit (20), configured to execute a program; and a program memory (30_1B), for storing the program. Each instruction in the program has a length of 16 bits, and the program memory has a first memory area (30_1B_1) and a second memory area (30_1B_2) in which higher addresses than the first memory area are associated. The arithmetic processing circuit has a 16-bit program counter (PC_1) for specifying an address to be read, and reads and executes an instruction at an address corresponding to an upper 15-bit (PC[15:1]) value of the program counter from a target memory area, wherein the target memory area is, of the first memory area and the second memory area, a memory area corresponding to a value of a least significant bit (L[0]) in the program counter.

Accordingly, a memory space of a memory can be expanded without memory bank switching. Compared to the means of memory bank switching, a memory space can be expanded without increasing a circuit scale, and a compiler change accompanied with the expansion is also quite simple. Accordingly, instruction efficiency does not deteriorate since memory bank switching is not needed. Moreover, the compatibility of an instruction set can be maintained while the memory space is expanded.

The computing device according to the first configuration (referring to FIG. 11) may also be configured as (a second configuration), wherein in the arithmetic processing circuit, each time an instruction other than a branch instruction is executed, 2 is added to the program counter; when the branch instruction is executed, a stored data (620) in a 16-bit storage area (610) for specifying a branch destination address is loaded into the program counter and branched to an address in either the first memory area or the second memory area according to the value of the least significant bit in the stored data.

Accordingly, branching to the expanded memory space can be easily accomplished by the branch instruction.

The computing device according to the second configuration may also be configured as (a third configuration), in the case of execution of the branch instruction by the arithmetic processing circuit, when a first value (for example, "0") is stored in the least significant bit of the program counter by loading the stored data into the program counter, branched to an address corresponding to the upper 15-bit (PC[15:1]) value in the program counter and within the first memory area; and when a second value ("1") is stored in the least significant bit of the program counter by loading the stored data into the program counter, branched to an address corresponding to the upper 15-bit (PC[15:1]) value in the program counter and within the second memory area.

Accordingly, branching to the expanded memory space can be easily accomplished by the branch instruction.

The computing device according to the third configuration (referring to FIG. 10) may also be configured as (a fourth configuration), wherein the arithmetic processing circuit reads and executes an instruction at a read target address from the program memory, the read target address is a 17-bit address, a value of a most significant bit (M[16]) of the read target address is represented by the value of the least significant bit (L[0]) in the program counter, the value of the least significant bit (M[0]) of the read target address is fixed at a predetermined value, and a value of a total of 15 bits (M[15] to M[0]) lower than the most significant bit and higher than the least significant bit in the read target address is represented by the upper 15-bit value (L[15] to L[1]) of the program counter.

A computing device (referring to embodiment EX_3B, and FIG. 19 to FIG. 22) according to another aspect of the present disclosure is configured (a fifth configuration) to include: an arithmetic processing circuit (20), configured to execute a program; and a program memory (30_nB), for storing the program. Each instruction in the program has a length of predetermined bits, the predetermined bits are J bits, in which $J=16\times 2^{n-1}$ and n represents an integer of 2 or more. The program memory has $1^{st}$ to $(2^n)^{th}$ memory areas (30_nB_[1]~30_nB_[$2^n$]), and an $(i+1)^{th}$ memory area is associated with an address higher than an $i^{th}$ memory area. The arithmetic processing circuit has a program counter (PC_n) of the predetermined bits for specifying an address to be read, and reads and executes an instruction at an address corresponding to a value of upper (J−n) bits (PC[J−1:n]) in the program counter from a target memory area, wherein the target memory area is a memory area corresponding to a value of lower n bits in the program counter among the $1^{st}$ to the $(2^n)^{th}$ memory areas.

Accordingly, a memory space of a memory can be expanded without memory bank switching. Compared to the means of memory bank switching, a memory space can be expanded without increasing a circuit scale, and a compiler change accompanied with the expansion is also quite simple. Accordingly, instruction efficiency does not deteriorate since memory bank switching is not needed. Moreover, the compatibility of an instruction set can be maintained while the memory space is expanded.

The computing device according to the fifth configuration (referring to FIG. 22) may also be configured as (a sixth configuration), wherein in the arithmetic processing circuit, each time an instruction other than a branch instruction is executed, $2^n$ are added to the program counter; when the branch instruction is executed, a stored data (820) in the storage area (810) of the predetermined bits for specifying a branch destination address is loaded into the program counter and branched to an address in any one of the $1^{st}$ to the $(2^n)^{th}$ memory areas according to the value (Z) of the lower n bits in the stored data.

Accordingly, branching to the expanded memory space can be easily accomplished by the branch instruction.

The computing device according to any one of the first to fifth configurations may also be configured as (a seventh configuration), in the case of execution of the branch instruction by the arithmetic processing circuit, when the value (Z) stored in the lower n bits of the program counter is a $k^{th}$ value after the stored data is loaded into the program counter, branched to an address in the $k^{th}$ memory area that is an address corresponding to the value of upper (J−n) bits in the program counter, in which k is an integer between 1 and $2^n$.

Accordingly, branching to the expanded memory space can be easily accomplished by the branch instruction.

The computing device according to any one of the first to fifth configurations may also be configured as (an eighth configuration), wherein the arithmetic processing circuit reads and executes an instruction at a read target address (ADR_n) from the program memory, the read target address is a (J+n)-bit address, a value of upper n bits (M[J+n−1]) to M[J]) of the read target address is represented by the value of the lower n bits (L[n−1] to L[0]) in the program counter, the value of the lower n bits (M[n−1] to M[0]) of the read target address is fixed at a predetermined value (for example, "0"), and a value of a total of (J−n) bits (M[J−1] to M[n]) lower than the upper n bits in the read target address and higher than the lower n bits is represented by the value of the upper (J−n) bits (L[J−1] to L[n]) in the program counter.

Moreover, in the computing device according to any one of the fifth to eighth configurations, n may also represent an integer of 1 or more. When "n=1", the computing devices of the fifth to eighth configurations are respectively equivalent to the computing devices of the first to fourth configurations.

While the present disclosure has been described by means of specific embodiments, numerous modifications and variations could be made thereto by those skilled in the art without departing from the scope and spirit of the present disclosure set forth in the claims.

The invention claimed is:

1. A computing device, comprising:
an arithmetic processing circuit, configured to execute a program; and
a program memory, for storing the program,
wherein;
each instruction in the program has a length of 16 bits,
the program memory has a first memory area and a second memory area in which higher addresses than the first memory area are associated,
the arithmetic processing circuit has a 16-bit program counter for specifying an address to be read,
the arithmetic processing circuit is configured to read a value of a least significant bit in the program counter to select one of the first memory area and the second memory area to be a target memory area with 32 K units of two bytes, and
the arithmetic processing circuit is further configured to read and execute an instruction at an address, in the target memory area, corresponding to an upper 15-bit value of the program counter.

2. The computing device of claim 1, wherein in the arithmetic processing circuit,
each time an instruction other than a branch instruction is executed, 2 is added to the program counter,
when the branch instruction is executed, a stored data in a 16-bit storage area for specifying a branch destination address is loaded into the program counter and branched to an address in either the first memory area or the second memory area according to the value of the least significant bit in the stored data.

3. The computing device of claim 2, wherein in the case of execution of the branch instruction by the arithmetic processing circuit,
when a first value is stored in the least significant bit of the program counter by loading the stored data into the program counter, branched to an address corresponding to the upper 15-bit value in the program counter and within the first memory area, and
when a second value is stored in the least significant bit of the program counter by loading the stored data into the program counter, branched to an address corresponding to the upper 15-bit value in the program counter and within the second memory area.

4. The computing device of claim 3, wherein
the arithmetic processing circuit reads and executes an instruction at a read target address from the program memory,
the read target address is a 17-bit address,
a value of a most significant bit of the read target address is represented by the value of the least significant bit in the program counter,
the value of the least significant bit of the read target address is fixed at a predetermined value, and
a value of a total of 15 bits lower than the most significant bit and higher than the least significant bit in the read target address is represented by the upper 15-bit value of the program counter.

5. The computing device of claim 2, wherein
the arithmetic processing circuit reads and executes an instruction at a read target address from the program memory,
the read target address is a 17-bit address,
a value of a most significant bit of the read target address is represented by the value of the least significant bit in the program counter,
the value of the least significant bit of the read target address is fixed at a predetermined value, and
a value of a total of 15 bits lower than the most significant bit and higher than the least significant bit in the read target address is represented by the upper 15-bit value of the program counter.

6. The computing device of claim 1, wherein
the arithmetic processing circuit reads and executes an instruction at a read target address from the program memory,
the read target address is a 17-bit address,
a value of a most significant bit of the read target address is represented by the value of the least significant bit in the program counter,
the value of the least significant bit of the read target address is fixed at a predetermined value, and
a value of a total of 15 bits lower than the most significant bit and higher than the least significant bit in the read target address is represented by the upper 15-bit value of the program counter.

7. A computing device, comprising:
an arithmetic processing circuit, configured to execute a program; and
a program memory, for storing the program, wherein
each instruction in the program has a length of predetermined bits,
the predetermined bits are J bits, in which $J=16 \times 2^{n-1}$ and n represents an integer of 2 or more,
the program memory has $1^{st}$ to $(2^n)^{th}$ memory areas, and $(i+1)^{th}$ memory area is associated with an address higher than $i^{th}$ memory area,
the arithmetic processing circuit has a program counter of the predetermined bits for specifying an address to be read, and reads and executes an instruction at an address corresponding to a value of upper (J−n) bits in the program counter from a target memory area, and
the target memory area is a memory area corresponding to a value of lower n bits in the program counter among the $1^{st}$ to the $(2^n)^{th}$ memory areas.

8. The computing device of claim 7, wherein in the arithmetic processing circuit,
   each time an instruction other than a branch instruction is executed, $2^n$ are added to the program counter,
   when the branch instruction is executed, a stored data in the storage area of the predetermined bits for specifying a branch destination address is loaded into the program counter and branched to an address in any one of the $1^{st}$ to the $(2^n)^{th}$ memory areas according to the value of the lower n bits in the stored data.

9. The computing device of claim 8, wherein in the case of execution of the branch instruction by the arithmetic processing circuit,
   when the value stored in the lower n bits of the program counter is a $k^{th}$ value after the stored data is loaded to the program counter, branched to an address in the $k^{th}$ memory area that is an address corresponding to the value of upper (J−n) bits in the program counter, in which k is an integer between 1 and $2^n$.

10. The computing device of claim 9, wherein
    the arithmetic processing circuit reads and executes an instruction at a read target address from the program memory,
    the read target address is a (J+n)-bit address,
    a value of upper n bits of the read target address is represented by the value of the lower n bits in the program counter,
    the value of the lower n bits of the read target address is fixed at a predetermined value, and
    a value of a total (J−n) bits lower than the upper n bits in the read target address and higher than the lower n bits is represented by the value of the upper (J−n) bits in the program counter.

11. The computing device of claim 8, wherein
    the arithmetic processing circuit reads and executes an instruction at a read target address from the program memory,
    the read target address is a (J+n)-bit address,
    a value of upper n bits of the read target address is represented by the value of the lower n bits in the program counter,
    the value of the lower n bits of the read target address is fixed at a predetermined value, and
    a value of a total (J−n) bits lower than the upper n bits in the read target address and higher than the lower n bits is represented by the value of the upper (J−n) bits in the program counter.

12. The computing device of claim 7, wherein
    the arithmetic processing circuit reads and executes an instruction at a read target address from the program memory,
    the read target address is a (J+n)-bit address,
    a value of upper n bits of the read target address is represented by the value of the lower n bits in the program counter,
    the value of the lower n bits of the read target address is fixed at a predetermined value, and
    a value of a total (J−n) bits lower than the upper n bits in the read target address and higher than the lower n bits is represented by the value of the upper (J−n) bits in the program counter.

13. A computing device, comprising:
    an arithmetic processing circuit, configured to execute a program; and
    a program memory, for storing the program,
    wherein each instruction in the program has a length of 16 bits,
       the program memory has a first memory area and a second memory area in which higher addresses than the first memory area are associated,
       the arithmetic processing circuit has a 16-bit program counter for specifying an address to be read, and is configured to read and execute an instruction at an address corresponding to an upper 15-bit value of the program counter from a target memory area, and
       the target memory area is, of the first memory area and the second memory area, a memory area corresponding to a value of a least significant bit in the program counter,
    wherein the arithmetic processing circuit is configured to read and execute an instruction at a read target address from the program memory,
       the read target address is a 17-bit address,
       a value of a most significant bit of the read target address is represented by the value of the least significant bit in the program counter,
       the value of the least significant bit of the read target address is fixed at a predetermined value, and
       a value of a total of 15 bits lower than the most significant bit and higher than the least significant bit in the read target address is represented by the upper 15-bit value of the program counter.

* * * * *